(12) United States Patent
Matsuoka et al.

(10) Patent No.: US 8,695,771 B2
(45) Date of Patent: Apr. 15, 2014

(54) LOCKUP DEVICE AND FLUID TYPE POWER TRANSMITTING DEVICE

(75) Inventors: Yoshihiro Matsuoka, Neyagawa (JP); Mitsugu Yamaguchi, Hirakata (JP); Takeshi Kawamoto, Yao (JP); Kazuhiro Yamashita, Hirakata (JP); Kazuaki Oomoto, Hirakata (JP)

(73) Assignee: EXEDY Corporation, Osaka (JP)

( * ) Notice: Subject to any disclaimer, the term of this patent is extended or adjusted under 35 U.S.C. 154(b) by 257 days.

(21) Appl. No.: 12/937,691

(22) PCT Filed: May 28, 2009

(86) PCT No.: PCT/JP2009/059740
§ 371 (c)(1),
(2), (4) Date: Oct. 13, 2010

(87) PCT Pub. No.: WO2009/147986
PCT Pub. Date: Dec. 10, 2009

(65) Prior Publication Data
US 2011/0031083 A1    Feb. 10, 2011

(30) Foreign Application Priority Data

Jun. 3, 2008   (JP) .................................. 2008-146306

(51) Int. Cl.
*F16H 45/02*   (2006.01)

(52) U.S. Cl.
USPC ................... 192/3.29; 192/30 V; 192/213.11; 192/213.21

(58) Field of Classification Search
USPC .............................. 192/213.11, 213.21, 213.3
See application file for complete search history.

(56) References Cited

U.S. PATENT DOCUMENTS

| | | | | |
|---|---|---|---|---|
| 3,223,214 A * | 12/1965 | Kuivinen | ............... | 192/70.17 |
| 3,266,271 A * | 8/1966 | Stromberg | ............... | 192/213.22 |
| 4,143,561 A * | 3/1979 | Melhorn | ............... | 192/214.1 |
| 5,086,892 A * | 2/1992 | Schierling | ............... | 192/3.29 |
| 5,377,796 A * | 1/1995 | Friedmann et al. | .......... | 192/3.29 |
| 5,713,442 A | 2/1998 | Murata et al. | | |
| 5,992,593 A | 11/1999 | Yamamoto | | |
| 7,073,646 B2 * | 7/2006 | Sasse et al. | ............... | 192/3.29 |
| 2004/0226794 A1 | 11/2004 | Sasse et al. | | |
| 2006/0096823 A1 * | 5/2006 | Maeda et al. | ............... | 192/3.29 |
| 2007/0131506 A1 * | 6/2007 | Wack et al. | ............... | 192/3.29 |

FOREIGN PATENT DOCUMENTS

| | | | |
|---|---|---|---|
| JP | 3542186 B2 | 9/1996 | |
| JP | 09-264399 A | 10/1997 | |
| JP | 10-169754 A | 6/1998 | |
| JP | 10-311373 A | 11/1998 | |

* cited by examiner

*Primary Examiner* — Rodney Bonck
(74) *Attorney, Agent, or Firm* — Global IP Counselors, LLP

(57) ABSTRACT

The object of the invention is to provide a lockup device that can improve a fuel efficiency of a vehicle. The lockup device (6) has a piston (61), an output plate (63), a first coil spring (65), an inertia member (64), and a second coil spring (66). The output plate (63) is coupled to a turbine (4) such that it can rotate as an integral unit with the turbine (4). The first coil spring (65) elastically couples the piston (61) to the output plate (63) in a rotational direction. The inertia member (64) is provided such that it can rotate relative to the output member (63). The second coil spring (66) elastically couples the inertia member (64) to the output plate (63) in a rotational direction.

4 Claims, 3 Drawing Sheets

LOCKUP DEVICE AND FLUID TYPE POWER TRANSMITTING DEVICE

CROSS-REFERENCE TO RELATED APPLICATIONS

This U.S. National stage application claims priority under 35 U.S.C. §119(a) to Japanese Patent Application No. 2008-146306, filed in Japan on Jun. 3, 2008, the entire contents of which are hereby incorporated herein by reference.

BACKGROUND

1. Technical Field

The present invention relates to a lockup device used in a fluid type power transmitting device.

2. Background Information

A known example of a fluid type power transmitting device is a torque converter equipped with a lockup device. The lockup device is a mechanism serving to connect mechanically a front cover and a turbine together and is arranged in a space between the front cover and the turbine. The lockup device allows torque to be transmitted directly from the front cover to the turbine.

A conventional lockup device has a piston and a damper mechanism. The piston is arranged such that it can move in an axial direction. When the piston is pushed against the front cover, it moves slidingly along with the front cover. The damper mechanism has a pair of retaining plates, a hub flange, and a plurality of springs that elastically connects the retaining plates and the hub flange together in a rotational direction. The retaining plates are held such that they can elastically deform the springs in the rotational direction and arranged to rotate as an integral unit with the piston. The hub flange is arranged between the pair of retaining plates and fixed to the turbine.

When the piston is pressed against the front cover using oil pressure and a torque is imparted to the front cover, the torque is transmitted to the turbine through the piston and the damper mechanism. During the torque transmission, torsional vibrations are absorbed and damped by the damper mechanism (e.g., see Japanese Patent Publication Number 3542186).

The lockup device presented in Japanese Patent Publication Number 3542186 has an inertia member provided in a torque transmission path to lower a resonance frequency to a frequency lower than a practical rotational speed and improve the vibration damping performance.

Meanwhile, in recent years, there is a demand to expand a lockup region in which the lockup device is used to transmit power into a region of lower traveling speeds in order to improve the fuel efficiency of a vehicle.

However, the lockup device presented in Japanese Patent Publication Number 3542186 is designed to be used only during normal travel of a vehicle and cannot easily secure an acceptable vibration damping performance at, for example, low traveling speeds. That is, the conventional lockup device cannot accommodate an expanded lockup region and it is difficult to improve the fuel efficiency of a vehicle using the conventional lockup device.

SUMMARY

An object of the present invention is to provide a lockup device that can improve a fuel efficiency of a vehicle.

A lockup device according to a first aspect of the invention is a device for mechanically connecting an input rotary body to an output rotary body. The lockup device has a piston, an output member, a first elastic member, an inertia member, and a second elastic member. The piston is provided such that it is pressed against the input rotary body by oil pressure. The output member is connected to the output rotary body such that it can rotate together with the output rotary body as an integral unit. The first elastic member serves to connect elastically the piston to the output member in a rotational direction. The inertia member is provided such that it can rotate relative to the output member. The second elastic member serves to connect elastically the inertia member to the output member in a rotational direction.

With this lockup device, when the piston is pressed against the input rotary member using oil pressure, the power is transmitted from the input rotary member to the output rotary member through the piston and the output member. If a rotational sped fluctuation is imparted to the input rotary member, then the rotational speed fluctuation is transmitted to the output rotary member through the output member. Since the inertia member is connected to the output member through the second elastic member, the rotational speed fluctuation is damped by the inertia member and the second elastic member. Thus, the inertia member and the second elastic member function as a dynamic damper. By adjusting an inertia amount of the inertia member and a stiffness of the second elastic member, a rotational speed fluctuation damping effect can be increased in a region of low rotational speeds. In other words, with this lockup device, the lockup region can be expanded and the fuel efficiency of a vehicle can be improved.

A lockup device according to a second aspect of the invention is a device according to the first aspect, further provided with a friction generating mechanism configured to generate frictional resistance in a rotational direction between the output member and the inertia member.

A lockup device according to a third aspect of the invention is a device according to the second aspect, wherein the friction generating mechanism has an annular friction member arranged to be sandwiched axially between the output member and the inertia member.

A lockup device according to a fourth aspect of the invention is a device according to any one of the first to third aspects, wherein the inertia member is supported in a radial direction by the output member.

A lockup device according to a fifth aspect of the invention is a device according to any one of the first to fourth aspects, wherein the inertia member is supported in an axial direction by the output member.

A torque converter according to a sixth aspect of the invention includes a front cover serving as an input rotary body, a turbine serving as an output rotary body, and a lockup device according to any one of the first to fifth aspects of the invention.

Since this fluid type power transmitting device is equipped with a lockup device according to any one of the first to fifth aspects, the vibration damping performance can be improved.

Examples of fluid type power transmitting devices include torque converters and fluid couplings.

DETAILED DESCRIPTION OF THE EXEMPLARY EMBODIMENTS

Embodiments of the present invention will now be explained with reference to the drawings.

Overall Configuration of Torque Converter

Figure 1:
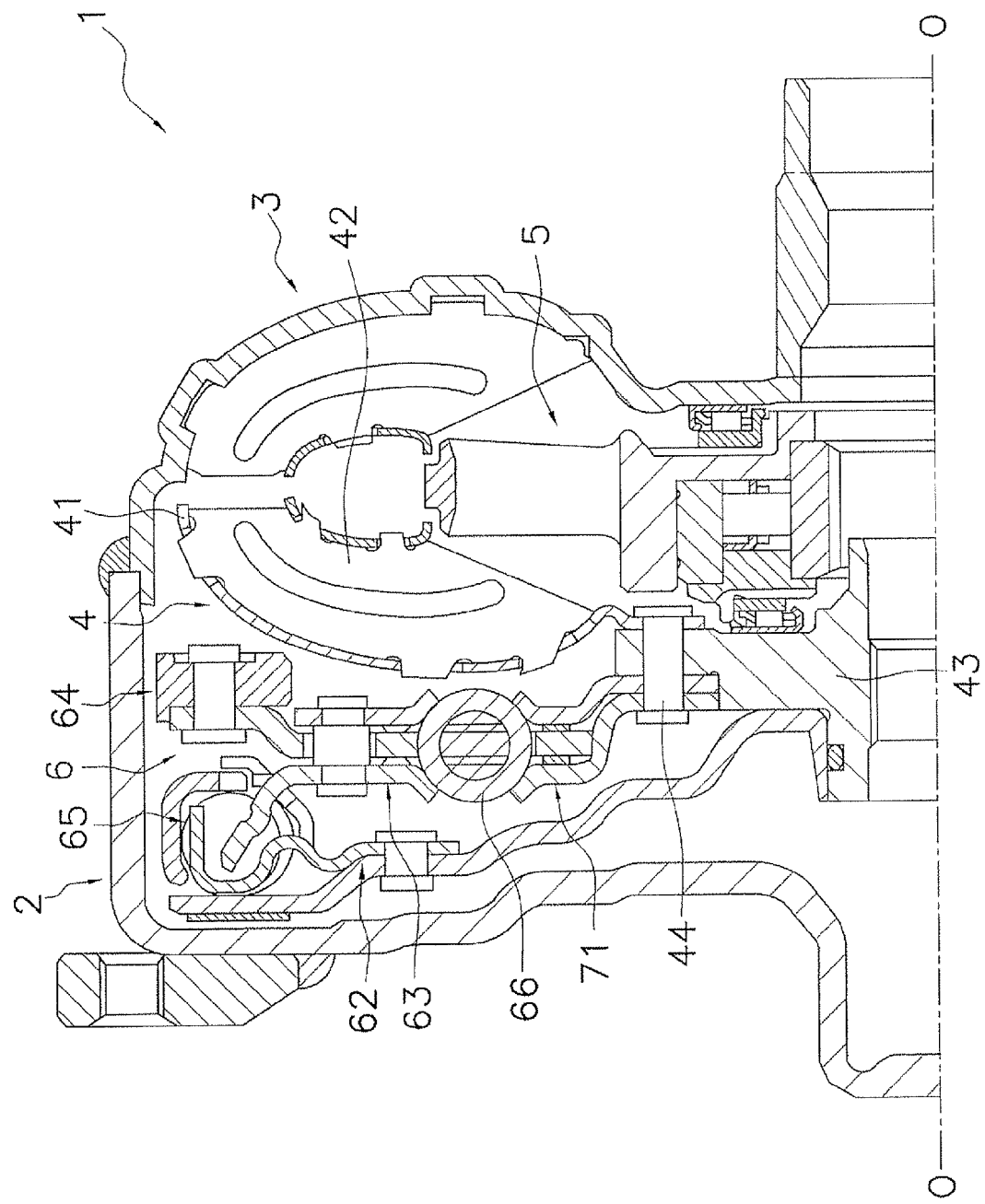
FIG. 1 is a vertical cross sectional schematic view of a torque converter.
Figure 2:
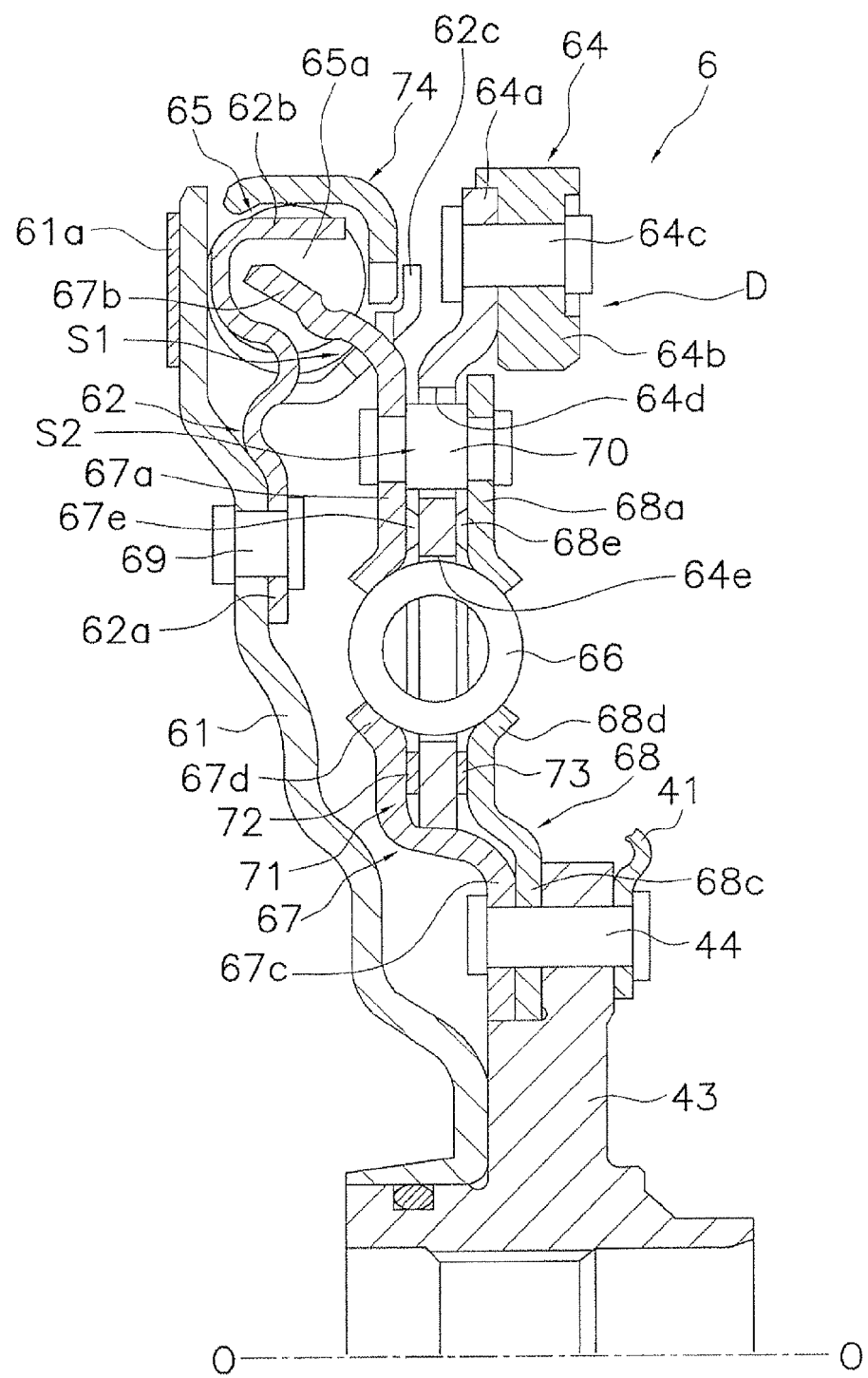
FIG. 2 is a vertical cross sectional schematic view of a lockup device of the torque converter.

A torque converter 1 exemplifying a fluid type power transmitting device will now be explained using FIGS. 1 and 2. FIG. 1 is a vertical cross sectional schematic view of the torque converter 1. FIG. 2 is a vertical cross sectional schematic view of a lockup device 6. An engine (not shown) is arranged on a left-hand side of FIG. 1 and a transmission (not shown) is arranged on a right-hand side of FIG. 1. The line O-O shown in FIG. 1 indicates a rotational axis of the torque converter 1.

The torque converter 1 is a device for transmitting power from a crankshaft (not shown) of the engine to an input shaft of the transmission and chiefly includes a front cover 2 (input rotary body) to which power is inputted, an impeller 3, a turbine 4 (output rotary body), a stator 5, and a lockup device 6.

The front cover 2 is fixed to the impeller 3 and a fluid chamber is formed by the front cover 2 and the impeller 3. The turbine 4 is arranged inside the fluid chamber facing opposite the impeller 3. The turbine 4 includes a turbine shell 41, a plurality of turbine blades 42 fixed to the turbine shell 41, and a turbine hub 43 fixed to the turbine shell 41 with rivets 44. The turbine hub 43 is coupled to the input shaft of the transmission (not shown). The stator 5 is a mechanism for regulating a flow of an operating oil from the turbine 4 to the impeller 3 and is arranged between the impeller 3 and the turbine 4.

Configuration of Lockup Device

The lockup device 6 is a device for mechanically coupling the front cover 2 and the turbine 4 together as necessary and is arranged between the front cover 2 and the turbine 4 as shown in FIG. 1. As shown in FIG. 2, the lockup device 6 includes a piston 61, a support plate 62, an output plate 63 (output member), an inertia member 64, a plurality of first coil springs 65 (first elastic members), a plurality of second coil springs 66 (second elastic members), a support ring 74, and a friction generating mechanism 71.

(1) Piston

The piston 61 is a member for establishing and releasing the connection between the front cover 2 and the turbine 4 and is provided such that it is pressed against the front cover 2 in response to the action of an oil pressure. More specifically, the piston 61 is supported on the turbine hub 43 of the turbine 4 such that it can move in an axial direction and can rotate relative to the turbine hub 43.

(2) Support Plate

The support plate 62 is fixed to the piston 61 and serves to support the end portions of the first coil springs 65 (more specifically, sheet members 65*a* attached to the end portions of the first coil springs 65) in a rotational direction. The support plate 62 includes a support plate main body 62*a*, a plurality of input claw-like portions 62*b*, and a plurality of holding portions 62*c*.

The support plate main body 62*a* is fixed to the piston 61 with a plurality of rivets 69. The input claw-like portions 62*b* are portions that extend radially outward from an outer circumferential portion of the support plate main body 62*a*. The input claw-like portions 62*b* are arranged between end portions of adjacent first coil springs 65 and serve to support the end portions of the first coil springs 65 in a rotational direction. The holding portions 62*c* are portions for supporting the first coil springs 65 in a radial direction and an axial direction and are arranged between the input claw-like portions 62*b* along a rotational direction. The length of each of the holding portions 62*c* in a rotational direction is set to be shorter than a space between adjacent input claw-like portions 62*b*, and the holding portions 62*c* are arranged and configured such that they can touch against output claw-like portions 67*b* of a first output plate 67 (explained later) in a rotational direction. Consequently, relative rotation between the piston 61 and the output plate 63 is limited to within a prescribed angular range. Thus, the output claw-like portions 67*b* and the holding portions 62*c* constitute a first stopper mechanism S1 that limits relative rotation between the piston 61 and the output plate 63 to within a prescribed angular range.

(3) Output Plate

The output plate 63 is coupled to the turbine 4 such that it can rotate as an integral unit with the turbine 4. The output plate 63 includes the first output plate 67 and a second output plate 68. The first output plate 67 and the second output plate 68 are fastened together with a plurality of stopper pins 70 such that they are attached with a prescribed spacing in an axial direction.

The first output plate 67 includes a generally annular first output plate main body 67*a*, a plurality of output claw-like portions 67*b* that extends outward in generally radial directions from an outer circumferential portion of the first output plate main body 67*a*, and a generally annular first fastening portion 67*c* that extends radially inwardly from an inner circumferential portion of the first output plate main body 67*a*. The first output plate main body 67*a* has first support portions 67*d* that can support end portions of the second coil springs 66 in a rotational direction. The output claw-like portions 67*b* are arranged between end portions of adjacent first coil springs 65 and serve to support the end portions of the first coil springs 65 in a rotational direction. The first fastening portion 67*c* is fastened to the turbine hub 43 with rivets 44. As will be explained later, the first fastening portion 67*c* supports the inertia member 64 in a radial direction.

The second output plate 68 includes a generally annular second output plate main body 68*a* and a generally annular second fastening portion 68*c* that extends radially inward from an inner circumferential portion of the second output plate main body 68*a*. The second output plate main body 68*a* has second support portions 68*d* that can support end portions of the second coil springs 66 in a rotational direction. The second fastening portion 68*c* is fastened to the turbine hub 43 with the rivets 44 along with the first fastening portion 67*c*.

The first output plate main body 67*a* has a plurality of first protruding portions 67*e*. The second output plate main body 68*a* has a plurality of second protruding portions 68*e*. The first protruding portions 67*e* and the second protruding portions 68*e* are made, for example, using a press forming process. A plate member 64*a* is arranged sandwiched axially-between the first protruding portions 67*e* and the second protruding portions 68*e*. Thus, the inertia member 64 is supported in an axial direction by the output plate 63.

(4) First Coil Springs

Each first coil spring 65 is a member for elastically coupling the piston 61 and the output plate 63 together in a rotational direction and is supported by the piston 61, the holding portions 62*c*, and the support ring 74 such that it can deform elastically in a rotational direction. Movement of each first coil spring 65 in an axial direction is limited to a prescribed range by the piston 61, the holding portions 62*c*, and the support ring 74. Movement of the first coil springs 65 in a radially outward direction is limited by the support ring 74. A pair of seat members 65*a* is attached to the ends of each of the first coil springs 65.

(5) Support Ring

The support ring 74 is an annular member for supporting the first coil springs 65 in a radial direction and is arranged radially outward from the first coil springs 65. The support ring 74 is provided such that it can rotate relative to the support plate 62. Movement of the support ring 74 toward the transmission is limited to a prescribed range by the holding portions 62c of the support plate 62. The support ring 74 stabilizes the operation of the first coil springs 65.

(6) Inertia Member

The inertia member 64 includes a generally annular plate member 64a, a generally annular inertia member main body 64b, and rivets 64c. The rivets 64c serve to fasten the inertia member main body 64b to an outer circumferential portion of the plate member 64a.

The inertia member main body 64b is arranged in substantially the same position as the first coil springs 65 along a radial direction. The inertia of the inertia member main body 64b is greatly affected by the inertia of the entire inertia member 64. The inertia of the inertia member 64 is adjusted by changing a dimension of the inertia member main body 64b.

The plate member 64a has a plurality of window holes 64e and a plurality of elongated holes 64d arranged radially outward from the window holes 64e. The second coil springs 66 are arranged in the window holes 64e. The elongated holes 64d are configured to be elongated in a rotational direction. A stopper pin 70 is inserted into each of the elongated holes 64d. The elongated holes 64d enable the plate member 64a and the output plate 63 to be rotated relative to each other within a prescribed angular range. In other words, the stoppers 70 and the elongated holes 64d constitute a second stopper mechanism S2.

The first fastening portion 67c of the first output plate 67 supports the plate member 64a of the inertia member 64 in a radial direction. Additionally, the inertia member 64 is supported in an axial direction by the output plate 63.

Thus, the inertia member 64 is supported in both a radial direction and an axial direction by the output plate 63.

(7) Second Coil Spring

The second coil springs 66 serve to couple elastically the inertia member 64 to the output plate 63 and are supported on the output plate 63 such that they can deform elastically in a rotational direction. In this embodiment, the second coil springs 66 are arranged farther inward in a radial direction than the first coil springs 65.

The second coil springs 66 are provided inside the window holes 64e of the plate member 64a. The second coil springs 66 are compressed when the output plate 63 and the inertia member 64 rotate relative to each other. The inertia member 64 and the second coil spring 66 constitute a dynamic damper D serving to improve the vibration damping performance.

(8) Friction Generating Mechanism

The friction generating mechanism 71 is a mechanism for generating a frictional resistance in a rotational direction between the output plate 63 and the inertia member 64 and includes an annular first friction member 72 and an annular second friction member 73. The first friction member 72 is arranged axially between the first output plate 67 and the plate member 64a. The second friction member 73 is arranged axially between the second output plate 68 and the plate member 64b. The first friction member 72 and the second friction member 73 are arranged radially inward of the second coil springs 66. The first friction member 72, the plate member 64a, and the second friction member 73 are arranged sandwiched axially between the first output plate 67 and the second output plate 68. Thus, the inertia member 64 is supported in an axial direction by the output plate 63.

Operation of Torque Converter

Operation of the torque converter 1 will now be explained. When the front cover 2 and the impeller 3 are rotating, the operating oil flows from the impeller 3 to the turbine 4 and power is transmitted from the impeller 3 to the turbine 4 through the operating oil. The power transmitted to the turbine 4 is transmitted to the input shaft (not shown) through the turbine hub 43.

If the rotational speed of the input shaft is substantially constant, then power will begin to be transmitted through the lockup device 6. More specifically, the piston 61 moves toward the engine due to a change of oil pressure and a friction facing 61a of the piston 61 is pressed against the front cover 2. As a result, the piston 61 rotates as an integral unit with the front cover 2 and power is transmitted from the front cover 2 to the support plate 62 through the piston 61.

When power is transmitted to the support plate 62, the first coil springs 65 are compressed in a rotational direction between the support plate 62 and the output plate 63 until eventually the output claw-like portions 67b touch against the holding portions 62c in a rotational direction. As a result, power is transmitted from the front cover 2 to the turbine 4 through the output plate 63.

Distinctive Features

Figure 3:
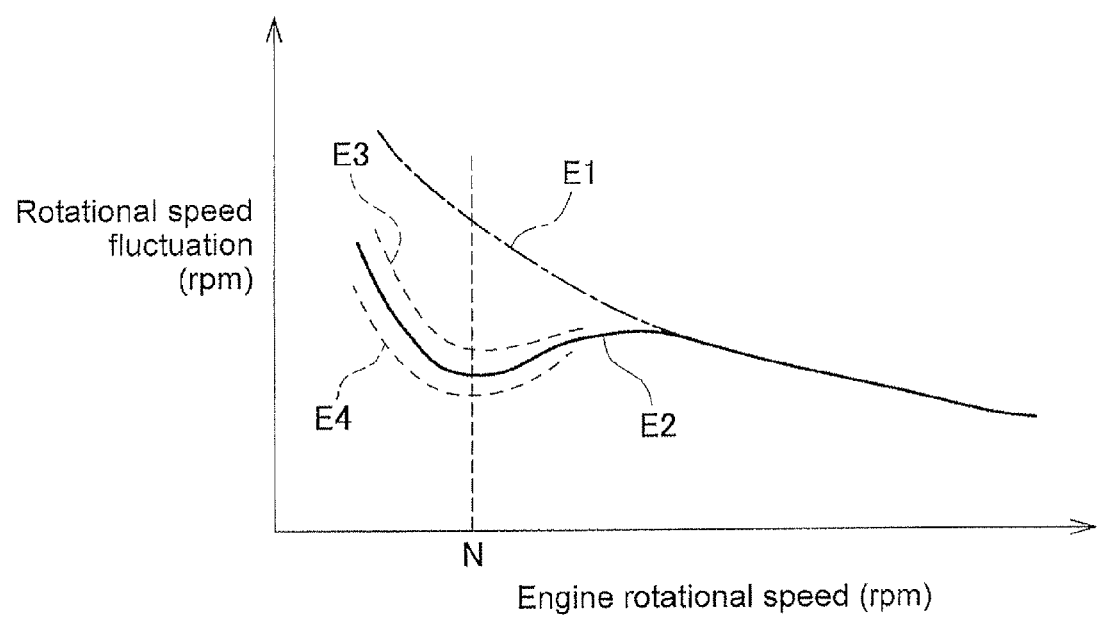
FIG. 3 illustrates an effect of the lockup device.

Distinctive features of the lockup device 6 will now be explained using FIG. 3. FIG. 3 shows a result obtained with the lockup device 6.

(1) When the engine rotational speed is low, rotational speed fluctuations caused by combustion fluctuations generally increase. As shown in FIG. 3, if there is not a dynamic damper D, then the rotational speed fluctuations outputted from the torque converter 1 will gradually increase as the engine rotational speed decreases (see the curve E1).

Conversely, if a dynamic damper D is present, then the rotational speed fluctuations outputted can be decreased in a vicinity of a particular engine rotational speed (see the curve E2). The particular engine rotational speed is defined to be a damping rotational speed N.

The damping rotational speed N is determined based on an inertia amount of the inertial member 64 and a stiffness of the second coil springs 66. Thus, by setting an inertia amount of the inertial member 64 and a stiffness of the second coil springs 66 appropriately, rotational speed fluctuations can be damped effectively in a desired region of engine rotational speeds.

Therefore, by designing the lockup device 6 such that the damping rotational speed N is set to a rotational speed in, for example, a low rotational speed region corresponding to low speed travel, the lockup region can be expanded and the fuel efficiency of the vehicle can be improved.

(2) Since the lockup device 6 is provided with a friction generating mechanism 71, a degree to which rotational fluctuations in the vicinity of the damping rotational speed N are damped can be adjusted in addition to adjusting the damping rotational speed N itself with the inertia member 64 and the second coil springs 66. More specifically, as shown in FIG. 3, under certain conditions, the degree of damping at the damping rotational speed N decreases when the frictional resistance generated by the friction generating mechanism 71 is increased (as exemplified by the curve E2 increasing to the curve E3 in the vicinity of the damping rotational speed N in FIG. 3) and the degree of damping at the damping rotational speed N increases when the frictional resistance generated by the friction generating mechanism 71 is decreased (as exemplified by the curve E2 decreasing to the curve E4 in the vicinity of the damping rotational speed N in FIG. 3).

In this way, the degree of damping in the vicinity of the damping rotational speed N can be increased by adjusting the magnitude of the friction resistance generated by the friction generating mechanism 71 and, thus, the lockup region can be expanded even further. As a result, the lockup device 6 can increase the fuel efficiency of a vehicle even further.

(3) With this lockup device 6, the friction generating mechanism 71 includes an annular first friction member 72 and an annular second friction member 73 arranged sandwiched axially between the output plate 63 and the inertia member 64. Thus, a friction generating mechanism 71 having a simple structure can be realized. As a result, a lockup device 6 having a high level of vibration damping performance can be obtained at a low cost.

(4) With this lockup device 6, the operation of the inertia member 64 is stable because the inertia member 64 is supported in a radial direction and an axial direction by the output plate 63.

(5) Since the torque converter 1 is equipped with the lockup device 6, it can improve the fuel efficiency of a vehicle.

Other Embodiments

The specific constituent features of the present invention are not limited to those of the previously described embodiment and various revisions and modifications can be made without departing from the scope of the invention as defined in the claims.

(1) Although in the embodiment the plate member 64a of the inertia member 64 is sandwiched between the first output plate 67 and the second output plate 68, it is acceptable for the output plate 63 to be a single plate. In such a case, the plate member 64a of the inertia member 64 is provided as a pair of plates and the output plate is sandwiched in-between this pair of plates.

(2) Although in the embodiment the fluid type power transmitting device is a torque converter 1, it is acceptable for the fluid type power transmitting device to be a fluid coupling not having a stator 5.

(3) Although in the embodiment the inertia member main body 64b is fastened to the plate member 64a with rivets 64c, it is acceptable for the inertia member main body 64b to be formed as an integral unit with the plate member 64a.

Industrial Applicability

With a lockup device and fluid type power transmitting device according to the present invention, a fuel efficiency of a vehicle can be improved. Therefore, the present invention is useful in the field of fluid type power transmitting devices.

What is claimed is:

1. A fluid type power transmitting device for transmitting power from an engine to a transmission via fluid, the transmission having an input shaft, comprising:
   a front cover;
   a turbine being configured to be rotated unitarily with the input shaft of the transmission; and
   a lockup device being configured to couple the front cover to the turbine, the lockup device having
      a piston arranged to be pressed against an input rotary body by oil pressure,
      an output member integrally coupled to an output rotary body to rotate with the output rotary body,
      a first elastic member elastically coupling the piston to the output member in a rotational direction,
      an inertia member arranged to rotate relative to the output member,
      a second elastic member elastically connecting the inertia member to the output member in the rotational direction, and
      a friction generating mechanism being configured to generate frictional resistance in a rotational direction between the output member and the inertia member when the output member and the inertia member relatively rotate,
      the friction generating mechanism having an annular friction member sandwiched in a axial direction between the output member and the inertia member,
      the inertia member being supported in a radial direction by the output member,
      the inertia member being supported in the axial direction by the output member.

2. The fluid type power transmitting device according to claim 1, wherein
   the output member includes first and second input plates,
   the first input plate is fixed to the turbine,
   the second input plate is fixed to the turbine and is arranged with the first input plate in the axial direct,
   the inertial member includes a plate member and a inertial main body,
   the plate member is arranged between the first and second plates, and
   the inertial main body is arranged on an outer periphery of the plate member and has a ring shape.

3. The fluid type power transmitting device according to claim 2, wherein
   a distance between a position at which the inertia main body is configured and the rotational axis in the radial direction is substantially equal to a distance between a position at which the first elastic member is configured and the rotational axis in the radial direction.

4. The fluid type power transmitting device according to claim 2, wherein
   a size of the inertia main body in the axial direction is larger than a size of the plate member in the axial direction.

* * * * *